O. D. WOODRUFF.
DOUGH MIXER AND KNEADER.
APPLICATION FILED OCT. 20, 1910.

984,728.

Patented Feb. 21, 1911.
2 SHEETS—SHEET 1.

Witnesses:
Louis B. Fischler
Chas. W. LaRue

Inventor:
Oliver D. Woodruff
by Wilbur M. Stone
Attorney

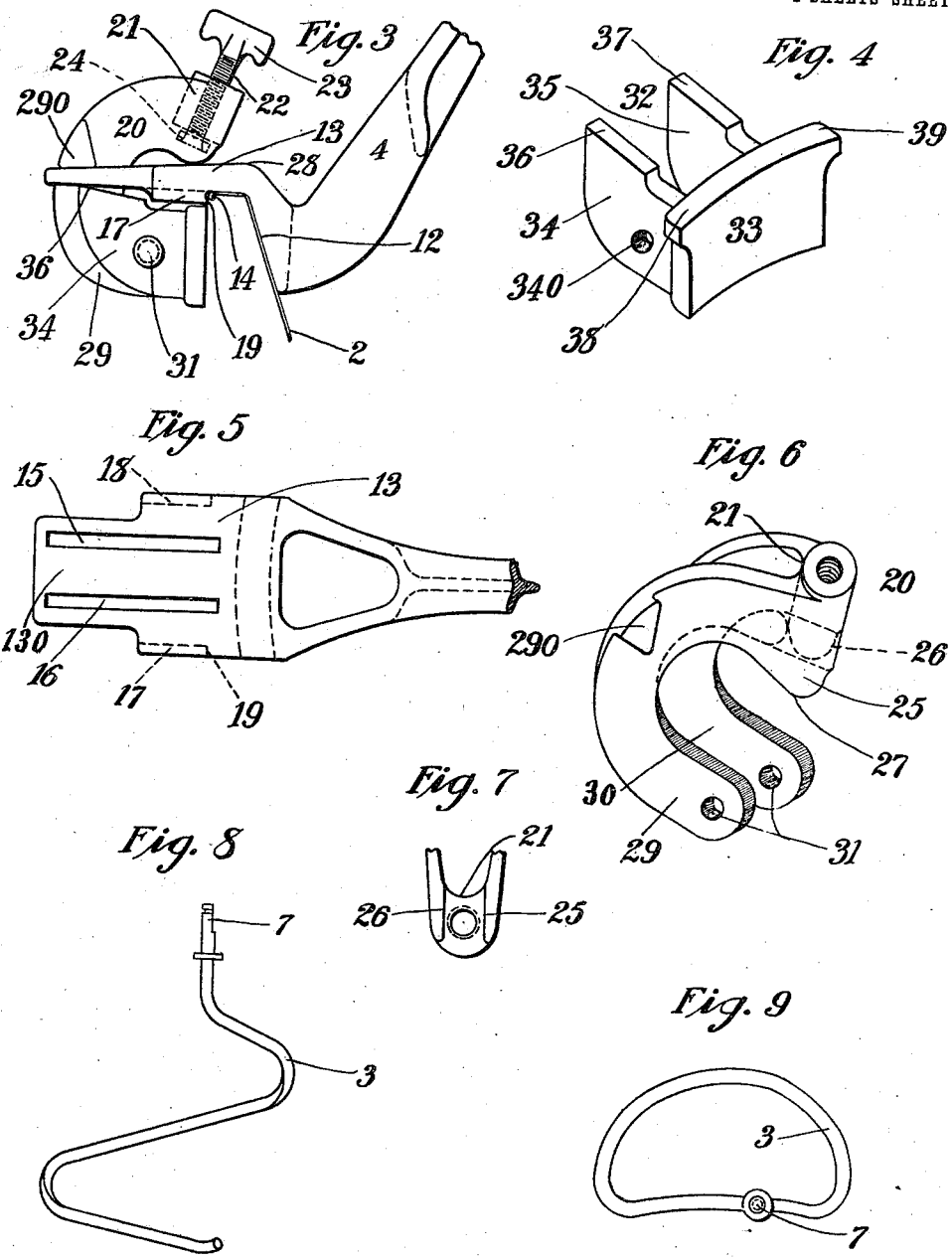

UNITED STATES PATENT OFFICE.

OLIVER D. WOODRUFF, OF SOUTHINGTON, CONNECTICUT.

DOUGH MIXER AND KNEADER.

984,728.  Specification of Letters Patent.  Patented Feb. 21, 1911.

Application filed October 20, 1910. Serial No. 588,147.

*To all whom it may concern:*

Be it known that I, OLIVER D. WOODRUFF, a citizen of the United States, and a resident of Southington, in the county of Hartford and State of Connecticut, have invented certain new and useful Improvements in Dough Mixers and Kneaders, of which the following is a specification.

This invention relates to mechanical dough mixers and kneaders for bread and the like and has for its object to provide a device of the class specified simple in construction and which can be manufactured at low cost.

To these ends my improvements comprise means illustrated in their preferred form in the accompanying drawings wherein—

Figure 1:
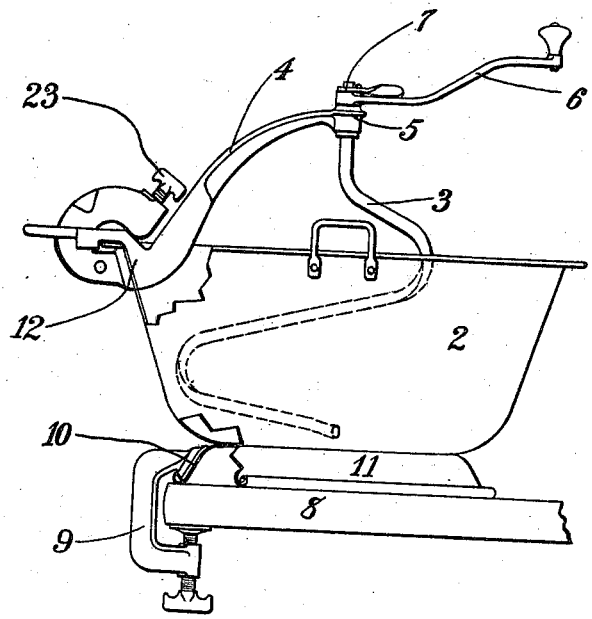
Figure 2:
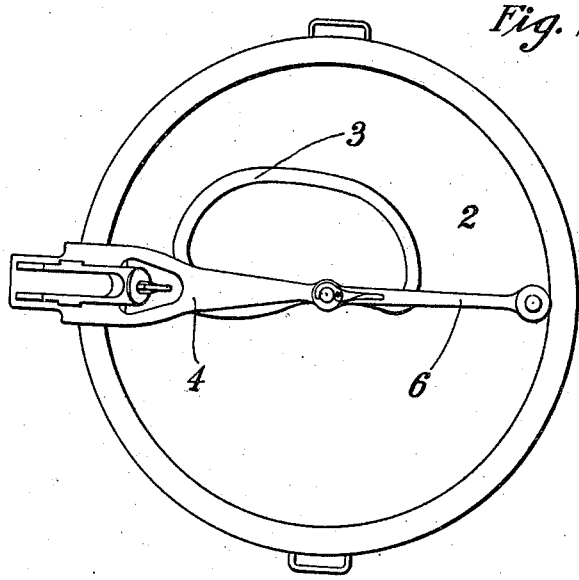

Figure 1 is a side elevation of the entire apparatus with portions of the pan broken away to more clearly show details. Fig. 2 is a plan view corresponding with what is shown in Fig. 1. Fig. 3 is an enlarged detail elevation of my improved means for securing the device to the pan. Fig. 4 is a perspective view of the clamping shoe. Fig. 5 is a plan view of the clamping portion of the main bracket. Fig. 6 is a perspective view of the clamp. Fig. 7 is a reversed plan view of a portion of said clamp. Fig. 8 is a side elevation of the rotor and Fig. 9 is a plan view thereof.

My present invention is in the nature of improvements in simplicity of construction and operation and in economy of manufacture, on the devices described and claimed in my Letters Patent 815,775 of March 20, 1906 and 842509 of Jan. 29, 1907. The devices of those patents each comprised vertical uprights which had to be carefully gaged in height to correspond with the height of the pan or vice versa and said uprights required more or less elaborate fastening devices. Also when said fastening devices were loosened the supporting arm was free to fall into the receptacle. In my present improvements I have entirely done away with said uprights and have materially simplified the means for securing my improved device to the pan. Also I have provided means whereby when the fastening device is loosened and even swung back into idle position the apparatus will remain in operable position and yet is free to be instantly lifted up and removed with one hand from the receptacle.

Referring now more particularly to the drawings receptacle or pan 2 has rotor 3 suitably supported therein by arm 4 in which said rotor is revolubly secured at 5 and has crank 6 removably fixed thereto at 7. Receptacle 2 may be secured to any suitable support such as table 8 by means of clamp 9 preferably having gripping means 10 conforming to the contour of receptacle foot 11.

Rotor supporting arm 4 is provided with abutment 12 for engagement with the inner face of receptacle 2 and extending outwardly from the upper part of said abutment is platform 13 overhanging edge 14 of said receptacle and having portion 130 outwardly reaching therefrom. Said platform is provided with one or more openings as 15, 16 therethrough on either side of portion 130 for the passage of lower arms 29, 30, of C clamp 20. These openings preferably comprise two parallel slots 15, 16 normal to abutment 12. C clamp 20 comprises upper arm or head 21 having clamp screw 22 threaded therein. Said screw has the usual winged head 23 and its point terminates in swivel shoe 24 between ears 25, 26 whereby turning of said shoe is prevented. Ears 25, 26 terminate in feet as 27 of ear 25 to enable clamp head 21 to be easily moved from the idle position of Fig. 3 to the locking position of Fig. 1 without shoe 24 catching on corner 28 of arm 4. Clamp 20 is provided preferably with two lower arms 29, 30 and pivotally attached thereto at 31 directly in the plane of screw 22 is shoe 32. Said shoe 32 comprises front abutment 33 for engagement with the outer face of receptacle 2 and is provided preferably with two rearwardly extending ears 34, 35 terminating in rear abutments 36, 37 for engagement with the under face of platform 13. Said shoe 32 is provided with hole 340 through ears 34, 35 between front abutment 33 and rear abutments 36, 37 for pivotal attachment to clamp 20 as already described. To suitably guide shoe 32 from its idle to its operative positions I provide guide rails 17, 18 on the under side of platform 13 for engagement with upper corners 38, 39 of front abutment 33. Said guide rails 17, 18 terminate at their inner ends in retaining ears as 19 of rail 17 for engagement with rim 14 of receptacle 2 in coaction with abutment 12 in engagement with the inner face of said receptacle for temporarily sustaining arm 4 in position when the locking means is in its inoperative position (Fig. 3).

The apparatus by means of my improvements can thus be effectively assembled on the receptacle or removed therefrom with one hand and during such manipulation arm 4 and the mechanism carried thereby is effectively prevented from falling into the receptacle or being in any way disarranged.

I claim:

1. In fastening means for the arm of a mixer and kneader, the combination of an abutment on the arm, a platform projecting from the upper part thereof, an opening through the platform, a C clamp having an upper arm bearing a clamp screw and a lower arm adapted to pass through said platform opening for coaction with the abutment for gripping an object therebetween.

2. In fastening means for the arm of a mixer and kneader, the combination of an abutment on the arm, a platform projecting from the upper part thereof, retaining ears projecting downwardly from the platform for coaction with said abutment for temporarily sustaining the arm in position, an opening through said platform, a C clamp having an upper arm bearing a clamp screw and a lower arm adapted to pass through said platform opening for coaction with the abutment for gripping an object therebetween.

3. In fastening means for the arm of a mixer and kneader, the combination of an abutment on the arm, a platform projecting from the upper part thereof, an opening through the platform, a C clamp having an upper arm bearing a clamp screw and a lower arm adapted to pass through said platform opening and having pivotally attached thereto a shoe, for coaction with the abutment for gripping an object therebetween.

4. A mixer and kneader, including in combination a receptacle, a rotor therein, a supporting arm for the rotor, means for securing said arm to the receptacle comprising an abutment on the arm, a platform projecting outwardly from the upper part of said abutment, an opening through the platform, a C clamp having an upper arm bearing a clamp screw and a lower arm adapted to pass through said platform opening, a stop lug on the clamp for engagement with the upper face of said platform and a shoe pivotally attached to said lower clamp arm for coaction with the abutment for gripping the receptacle.

5. A mixer and kneader, including in combination a receptacle, a rotor therein, a supporting arm for the rotor, means for securing said arm to the receptacle, comprising an abutment on the arm for engagement with the inner face of the receptacle, a platform on the arm overhanging the edge of the receptacle, an opening through said platform, a C clamp having an upper arm bearing a clamp screw and a lower arm adapted to pass through said platform opening, a stop lug on the C clamp for engagement with the upper face of said platform, a shoe comprising a front abutment for engagement with the outer face of said receptacle, an ear extending rearwardly from said front abutment and terminating in a rear abutment for engagement with the under face of said platform, said shoe being pivotally attached between its front and rear abutments to the lower arm of the C clamp and guide rails for said shoe on the under face of said platform, said guide rails terminating at their inner ends in retaining ears for coaction with the arm abutment for temporarily sustaining the arm in position.

6. In fastening means for the arm of a mixer and kneader, the combination of an abutment on the arm, a platform having an outwardly reaching portion projecting from the upper part thereof, a C-clamp having an upper arm bearing a clamp screw and two lower arms adapted to straddle said outwardly reaching portion of the platform for co-action with the abutment for gripping an object therebetween.

7. In fastening means for the arm of a mixer and kneader, the combination of an abutment on the arm, a platform having an outwardly reaching portion projecting from the upper part thereof, a C-clamp having an upper arm bearing a clamp screw, and a pair of lower arms adapted to straddle said outwardly reaching portion of the platform and having a shoe pivotally attached to said lower arms for co-action with the abutment for gripping an object therebetween.

Signed at New York, N. Y., this 17th day of October 1910 before two subscribing witnesses.

OLIVER D. WOODRUFF.

Witnesses:
ANNA M. ST. JOHN,
CAROLINE A. GRAY.